(12) United States Patent
Koeune et al.

(10) Patent No.: US 11,181,322 B2
(45) Date of Patent: Nov. 23, 2021

(54) FUEL-OIL HEAT EXCHANGER

(71) Applicant: SAFRAN AERO BOOSTERS SA, Herstal (BE)

(72) Inventors: Roxane Koeune, Herstal (BE); Nicolas Fellin, Herstal (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 32 days.

(21) Appl. No.: 16/719,571

(22) Filed: Dec. 18, 2019

(65) Prior Publication Data

US 2020/0200482 A1  Jun. 25, 2020

(30) Foreign Application Priority Data

Dec. 21, 2018  (BE) .................................. 2018/5931

(51) Int. Cl.
*F28D 7/10* (2006.01)

(52) U.S. Cl.
CPC ..................................... *F28D 7/10* (2013.01)

(58) Field of Classification Search
CPC ........................................................ F28D 7/10
USPC ......................................................... 165/154
See application file for complete search history.

(56) References Cited

U.S. PATENT DOCUMENTS

| 5,427,174 A * | 6/1995 | Lomolino, Sr. ...... F28D 15/0233 165/104.13 |
| 9,976,815 B1 | 5/2018 | Roper et al. |
| 10,843,267 B2 * | 11/2020 | Davidson ............ F28D 1/05333 |
| 2008/0041566 A1 * | 2/2008 | Scott .......................... G06F 1/20 165/104.33 |
| 2018/0057942 A1 | 3/2018 | Yanzhe et al. |
| 2018/0187984 A1 | 7/2018 | Manzo |
| 2018/0297843 A1 | 10/2018 | Lo et al. |

FOREIGN PATENT DOCUMENTS

EP          2775244 A1    9/2014

OTHER PUBLICATIONS

Search Report dated Sep. 9, 2019 for BE 201805931.

* cited by examiner

*Primary Examiner* — Davis D Hwu
(74) *Attorney, Agent, or Firm* — James E. Walton

(57) ABSTRACT

A turbine engine heat exchanger for exchanging heat between a first fluid and a second fluid includes a reference axis, a network of tubular meshes having a plurality of meshes each of which is formed, successively in a reference direction, of at least two curvilinear branches, called anterior branches, of a junction where the two anterior branches meet, and of at least two curvilinear branches, called posterior branches, diverging from the junction, wherein the meshes are stacked in staggered rows.

9 Claims, 6 Drawing Sheets

FUEL-OIL HEAT EXCHANGER

This application claims priority under 35 U.S.C. § 119 to Belgium Patent Application No. 2018/5931, filed 21 Dec. 2018, titled "Fuel-Oil Heat Exchanger," which is incorporated herein by reference for all purposes.

BACKGROUND

1. Field of the Application

The present application relates to the field of turbomachine heat exchangers. More precisely, the present application proposes an oil/fuel heat exchanger or a turbomachine. The present application also relates to an axial turbomachine, in particular a turbojet engine. The present application also proposes a process for making a heat exchanger.

2. Description of Related Art

Document US 2018/0057942 A1 discloses an oil/fuel exchanger for an aircraft and made by additive manufacturing. This exchanger comprises a group of straight parallel channels formed between two manifolds. The fuel flows through these channels and is heated by oil that flows through a cavity delimited by guide walls and a cylindrical wall. The known exchanger does not allow a homogeneous distribution of the fuel flowing through the channels. This implies that the heat exchange capacity is not fully exploited in all areas of the cavity.

Another example of a heat exchanger is given in U.S. Pat. No. 9,976,815 B1, which includes a network of non-linear tubes arranged in parallel. This state-of-the-art exchanger also does not allow a homogeneous distribution of the two fluids.

Finally, document US 2018/0187984 A1 describes an exchanger comprising a so-called gyroid structure, i.e. a minimum surface area that is triplicated periodically. Such an exchanger has the disadvantage that the surfaces in contact with the two fluids are identical, which is not always interesting for an exchanger, particularly due to the different flow rates for the two fluids involved. To compensate for this inherent difference in flow, it is necessary to add fins to the gyroid structures to form obstacles slowing one of the fluids. However, the fins are difficult to integrate into a so-called gyroid structure. This design also requires a special manufacturing process, in this case LBM (Laser Beam Machining).

Although great strides have been made in the area of turbomachine heat \exchangers, many shortcomings remain.

DETAILED DESCRIPTION OF THE PREFERRED EMBODIMENT

Figure 1:
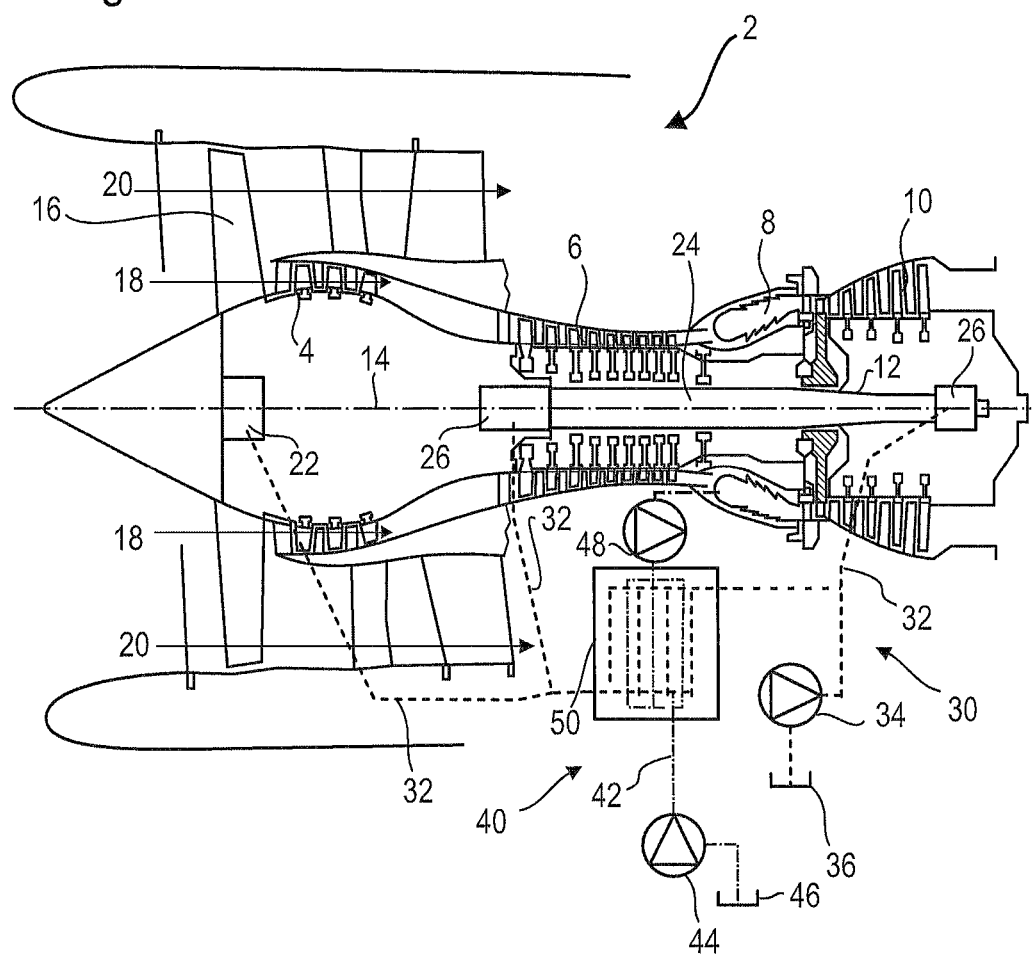
FIG. 1 shows a turbomachine according to the present application.

The present application aims to solve at least one of the problems posed by the prior art. The purpose of the present application is to optimize heat exchange, pressure drops and possibly the operation of a turbomachine. The present application also aims to provide a simple and compact solution.

The present application relates to a heat exchanger between a first fluid and a second fluid, in particular a turbomachine heat exchanger, the heat exchanger comprising: a reference direction; and a network of tubes delimiting an inner passage for the first fluid, the network of meshes comprising a plurality of meshes, each of the meshes being formed, successively in the reference direction, of at least two curvilinear branches, called anterior branches, of a junction where the two anterior branches meet, and of at least two curvilinear branches, called posterior, diverging from the junction; wherein the plurality of meshes comprises at least a first mesh, a second mesh and a third mesh, and wherein at least one anterior branch of the first mesh is connected to at least one posterior branch of the second mesh and at least one other anterior branch of the first mesh is connected to at least one posterior branch of a third mesh.

According to preferred embodiments, the heat exchanger includes one or More of the following technical characteristics, in any possible combination:

a stacking of 5 to 40 meshes in the reference direction;

between 200 and 3000 meshes;

the thickness of the wall forming the branches and junctions is between 0.4 and 0.8 mm;

the number of anterior branches is different from the number of subsequent branches for a given mesh;

the number of anterior branches is equal to the number of posterior branches for a given mesh;

the number of anterior branches of the first mesh is different from the number of anterior branches of the second mesh and/or the number of posterior branches of the first mesh is different from the number of posterior branches of the second mesh;

the number of branches of each mesh is 4, 6, 8, 10 or 12;

at least one of the meshes supports at least one internal or external fin;

the tubular mesh network is arranged between an inlet partition and an outlet partition. The tubular mesh network opens into orifices of the inlet and outlet partitions. The tubular mesh network guides the first fluid from an inlet manifold to an outlet manifold, the inlet manifold being partially delimited by the inlet partition and the outlet manifold being partially delimited by the outlet partition;

a body with a side wall, the inner surface of the wall delimiting a cavity in which the second fluid flows;

the side wall of the heat exchanger body is substantially cylindrical in shape, with a diameter preferably between 7 and 25 cm and a height preferably between 10 and 60 cm, the axis of the cylinder being aligned with the reference direction;

a bypass channel for the first fluid to bypass the tubular mesh network, the bypass channel being arranged in a central position of the exchanger and substantially aligned with the reference direction. The network is thus arranged in an annular space surrounding the bypass;

the diameter of the bypass channel is preferably between 30 and 60% of the body diameter;

the exchanger is parallel and/or counter-current. Thus, the main flow directions of the two fluids are parallel and of the same direction or parallel and opposite direction;

at least one guide element and/or the inner surface of the side wall which guides the second fluid in a first part of the cavity in a flow direction substantially parallel to the reference direction and over at least a majority of the body height;

the guide member further guides the second fluid in another part of the cavity over at least a majority of the body height in a direction opposite to the reference direction;

the guide element comprises at least one partition wall extending in part in a plane parallel to the reference direction and extending from the inlet partition;

the heat exchanger is made of aluminium;

the heat exchanger is made of a single piece. Thus, all the mesh networks, collectors, bypass and exchanger body are made in one piece and are manufactured altogether during a single manufacturing operation;

the heat exchanger is suitable for receiving fuel as the first fluid and oil as the second fluid;

a bypass for the second fluid is integrated in the heat exchanger;

a discharge and/or thermostatic type valve is arranged in the bypass channel for the first fluid or the bypass for the second fluid;

the distribution of the meshes in the exchanger is not necessarily homogeneous. Thus, the number of meshes can be denser radially inside or radially outside. The mesh density may be higher axially in the vicinity of the fluid inlet to facilitate a very chaotic flow of fluids as they enter the exchanger. Also, the mesh diameters may vary according to the successive mesh stages along the flow direction for example inversely proportional to the mesh density.

The present application also concerns an aircraft turbojet engine comprising bearings and in particular a gearing driving a fan, and the heat exchanger as described above.

The present application also concerns a process for making a heat exchanger according to the present application, the process comprising the following steps:

(a) design of the heat exchanger;

(b) realization of the heat exchanger according to the present application by additive manufacturing in a printing direction parallel to the reference direction.

The present application can alternatively be defined by a heat exchanger wherein at least one mesh has all but one of its anterior branches connected to posterior branches of a second mesh.

The present application may alternatively be defined by a heat exchanger wherein the plurality of meshes comprises mesh stages successively arranged in accordance with the reference direction, each junction of the meshes of a given stage being offset (optionally in staggered rows) with respect to the junctions of the adjacent stage, in a direction perpendicular to the reference direction.

The proposed solution is a compact, lightweight and efficient solution in terms of heat exchange. The special structure of the tubular mesh network allowing fluid redistribution over all the meshes ensures that all areas of the heat exchanger, even the most remote areas (radially), have optimal heat exchange. This solution makes it possible to reduce the size and therefore the weight of the exchanger, while maintaining the same efficiency. The shape of the curved pipes and the repetition of crossing zones between the tubes promote turbulence and therefore improve heat transfer. In addition, the tubular mesh network forms a self-supporting structure that improves the design of the assembly and removes the need for any additional mechanical supports within the heat exchanger. The presence of a central by-pass avoids the risk of clogging, when the exchanger is being operated in extreme cold. Finally, the exchanger is a monobloc part eliminating the risk of leakage while guaranteeing very good resistance to stress.

FIG. 1 shows a simplified representation of an axial turbomachine or turbojet engine or turbine engine 2. The turbojet 2 consists of a first, low-pressure compressor 4 and a second, high-pressure compressor 6, a combustion chamber 8 and one or more turbines 10. During operation, the mechanical power of the turbine 10 transmitted to the rotor 12 drives both compressors 4 and 6. The latter include several rows of rotor blades associated with stator blade rows. The rotation of the rotor around its axis of rotation 14 thus makes it possible to generate an air flow and gradually compress it up to the inlet of combustion chamber 8.

A fan 16 is coupled to rotor 12 and generates an air flow that is divided into a primary flow 18 and a secondary flow 20 through an annular duct (partially represented) along the machine and then joining the primary flow at the turbine outlet.

Gearshift means, such as a reduction gearbox 22, can reduce the rotational speed of the fan and/or low-pressure compressor relative to the associated turbine. The secondary flow can be accelerated to generate the thrust response required to fly an aircraft.

The rotor 12 includes a drive shaft 24 mounted on the housing by means of two bearings 26.

In order to lubricate the rotating parts of the turbojet 2, a lubrication system 30 is provided. This circuit 30 includes pipes 32 to transport the oil to the components of the turbojet engine, such as gearbox 22 and bearings 26. Circuit 30 includes for this purpose a pump 34 to set the oil in motion in circuit 30 and a tank 36. The oil return lines of the components and their associated discharge pumps are not shown.

FIG. 1 also shows a fuel system 40, with pipes 42, a low-pressure pump 44, a high-pressure pump 48 and a tank 46, for example housed in a wing.

The oil lubricating the bearings 22, 26 and 26 is heated and must be cooled. For that purpose, a Fuel Cooled Oil Cooler exchanger (FCOC 50) is provided to regulate the oil temperature in circuit 32. The use of fuel stored in the wings, which is cold at high altitude, allows the oil to cool.

Figure 2:
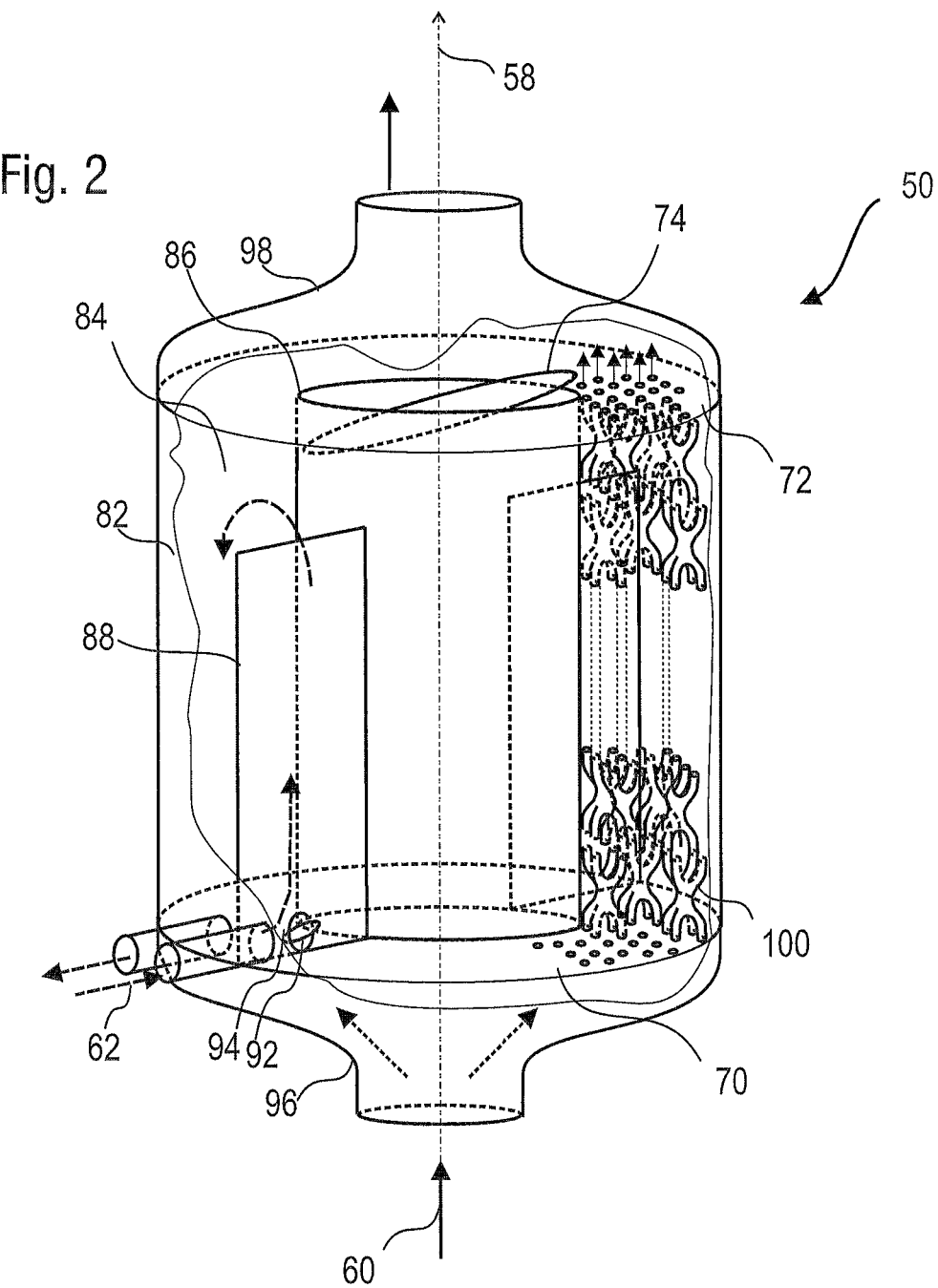
FIG. 2 illustrates an exchanger according to the present application.

FIG. 2 illustrates the heat exchanger according to the present application.

The heat exchanger 50 comprises a heat exchanger matrix consisting of a network of tubular meshes 100 arranged between an inlet partition 70 and an outlet partition 72. The flow paths formed by the network of tubular meshes 100 opens out through the partitions 70, 72. The tubular mesh network 100 guides a first fluid 60 (e.g. fuel) from an inlet manifold 96 to an outlet manifold 98. The tubular mesh network 100 consists of several stages of staggered meshes. Each mesh includes branches in the form of curvilinear tubes emanating from a junction. The network 100 has a set of passages that separate and join together while ensuring a redistribution of the fluid between them. A given fluid particle can therefore pass from one mesh to another by evolving radially and/or circumferentially with respect to the centre of the exchanger. The network 100 can have a symmetry (or not).

The heat exchanger 50 can comprise a body with a side wall 82 surrounding the network 100, the inner surface of the side wall 82 and the two walls 70, 72 partially delimiting a cavity 84 in which a second fluid 62 (e.g. oil) flows. The side wall 82 of the heat exchanger 50 can be substantially cylindrical in shape, with a diameter preferably between 7 and 25 cm, and a height preferably between 10 and 60 cm, the axis of the cylinder being aligned with the reference direction 58.

The exchanger 50 can include a bypass channel 86 for the first fluid 60 to bypass the network 100, the bypass channel 86 being formed in a central position of the exchanger 50, the bypass channel 86 being substantially aligned with the reference direction 58. The diameter of the bypass channel 86 can be between 30 and 60% of the body diameter. The presence of by-pass channel 86 makes it possible to stiffen the structure and facilitates the maintenance of the tubular mesh network 100.

The exchanger 50 can be parallel (i.e. the first and second fluid flow in the same direction) and/or counter-current (they flow in opposite direction). In the example shown, it is both parallel current in one part of the exchanger and counter-current in another part of the exchanger. For this purpose, a guide element 88 is provided to guide the second fluid 62 into a portion of cavity 84 in a flow direction substantially parallel to the reference direction 58. In addition, the guide element 88 guides the second fluid 62 into another portion of the cavity over at least a majority of the body height in a direction opposite to the reference direction 58. The guide element 88 may include at least one partition wall extending in a plane parallel to the reference direction 58 and arranged between the two partitions 70, 72. The guide element 88 in FIG. 2 allows a return flow for the second fluid 62.

The bypass channel 86 of the first fluid can include a 74 valve of the discharge and/or thermostatic type. Also, the exchanger may include a bypass 92 for the second fluid integrated into the body of the heat exchanger 50. In the example in FIG. 2, the bypass 92 is formed in the lower part of the partition wall serving as guide element 88. Alternatively, bypass channel 92 can be made in a module integral with the wall 82 of the heat exchanger body 50, the module can be integral with the wall of the heat exchanger 50. A valve 94 of the discharge and/or thermostatic type can be installed in bypass channel 92.

Figure 3:
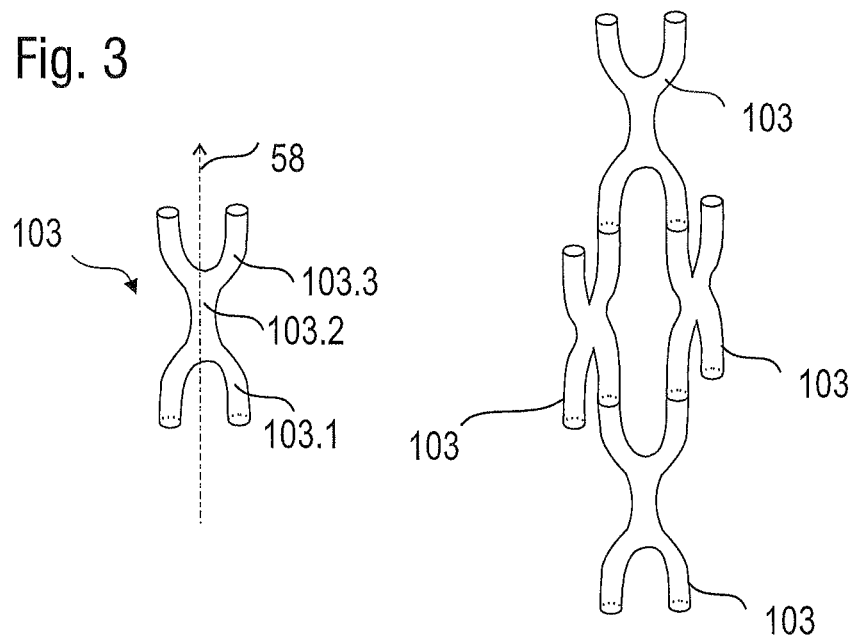
FIG. 3 shows a first mesh variant with four branches arranged in a plane.

FIG. 3 represents another embodiment of the present application where mesh 103, which serves as the base pattern for the tubular mesh network 100, comprises four branches arranged in a plane, including, successively in orientation 58, two anterior branches 103.1, one junction 103.2 and two posterior branches 103.3. This base pattern can be stacked to form a flat or curved sheet of tubes (not shown). The meshes 103 of an upper stage (top and bottom of right side of FIG. 3) may be rotated by e.g. 90 degrees with respect to the 103 meshes of the lower stage (middle of right side of FIG. 3). This second structure allows a better three-dimensional redistribution of the fluid.

Figure 4:
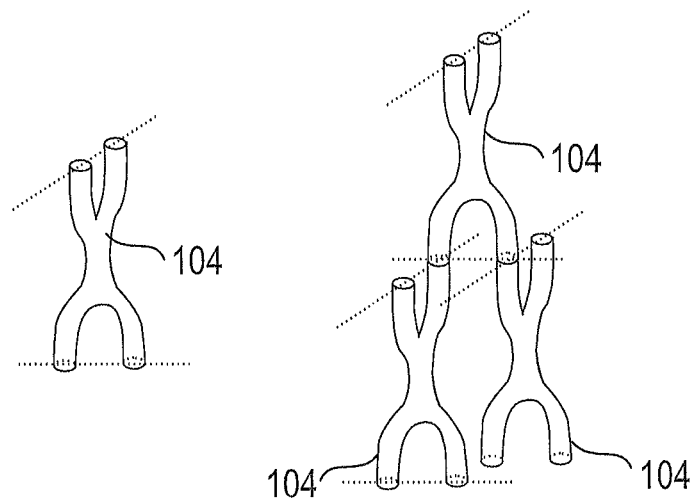
FIG. 4 shows a second mesh variant with four branches, arranged in two secant planes.

FIG. 4 shows an embodiment with meshes 104 with four branches in which the two posterior branches are arranged in a plane that is secant with respect to the anterior branches.

Figure 5:
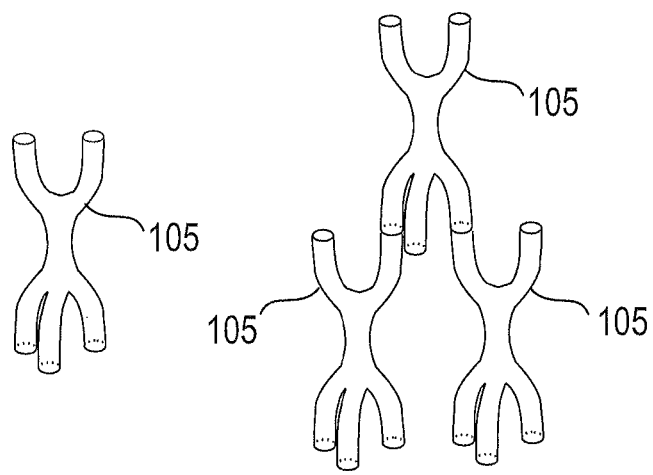
FIG. 5 illustrates a third mesh variant, called asymmetric with five branches.

FIG. 5 illustrates an embodiment of meshes 105 with five branches with two posterior branches and three anterior branches. This configuration is asymmetrical.

Figure 6:
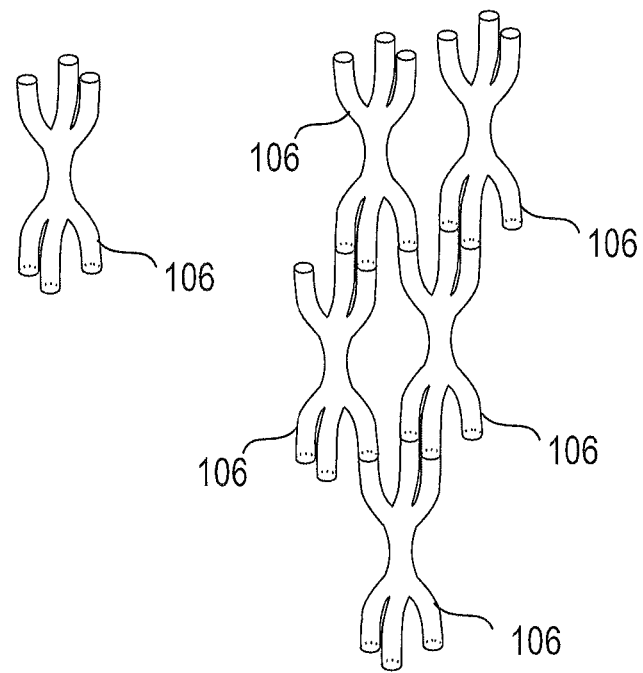
FIG. 6 shows a fourth mesh variant with six branches with rotational symmetry.

FIG. 6 shows another embodiment of meshes 106 with six branches With rotational symmetry. The anterior or posterior branches can be evenly distributed, with an angle of about 120 degrees between the planes in which the branches are located.

Figure 7:
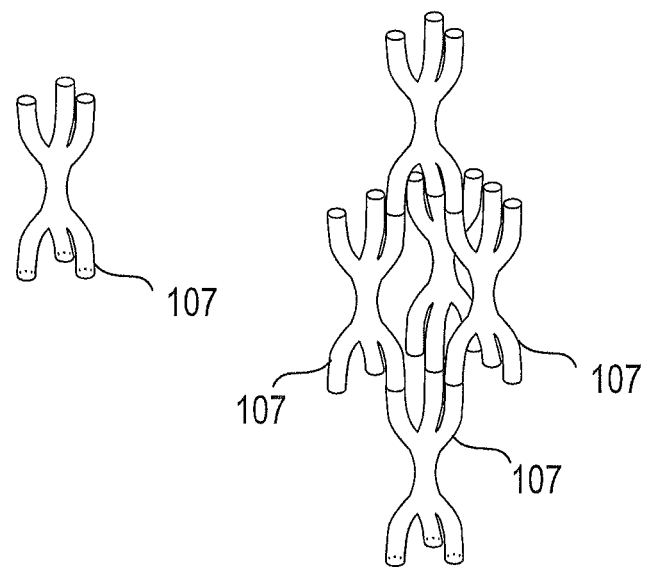
FIG. 7 shows a fifth mesh variant with six branches with specular symmetry.

FIG. 7 shows an embodiment with a mesh 107 with six branches with specular symmetry. The anterior or posterior branches can be evenly distributed, with an angle of about 120 degrees between the planes in which the branches are located.

Figure 8:
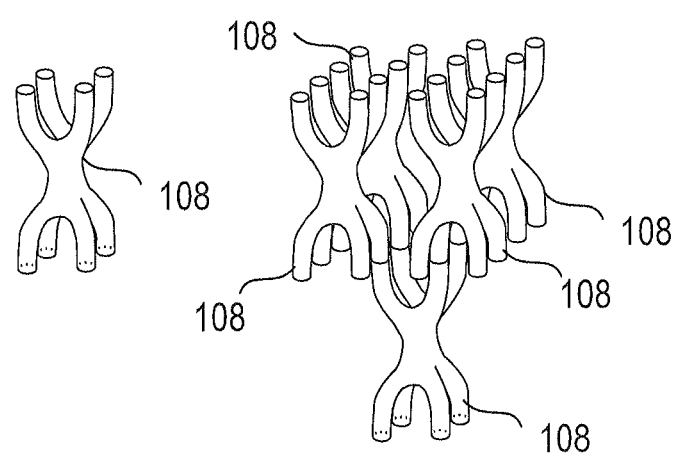
FIG. 8 shows a sixth mesh variant with eight branches with specular symmetry.

FIG. 8 illustrates an embodiment with a mesh 108 with eight branches with specular symmetry. The anterior or posterior branches can be evenly distributed, with an angle of about 90 degrees between the planes in which the branches are located.

These different mesh illustrations are given as examples. The skilled person would be able to adapt the number of branches and their orientations, the number of meshes, their relative orientations, according to his needs and in particular the flow rates or the desired compactness for the exchanger.

Figure 9:
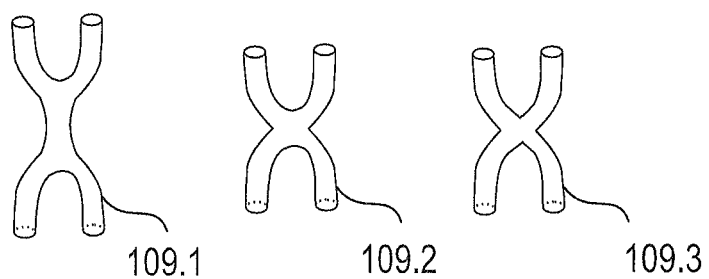
FIG. 9 illustrates different alternative embodiments for junctions.

FIG. 9 shows a mesh 109.1 with a junction as an intermediate tube. In this configuration, the cross-section of the internal passage is approximately equal to half the sum of the passage cross-sections of each branch. This configuration results in pressure drops that may be desired to slow down a flow rate.

Alternatively, meshes 109.2 and 109.3 may be designed in such a way that the posterior branches are joined directly to the anterior branches forming a chamber at junction 103.2. The chamber improves the mechanical strength of the assembly. The junction of mesh 109.2 includes a rounding to improve the strength of the structure. For example, a water drop shape—seen in a plane parallel to the reference direction—can facilitate the realization by additive manufacturing because it is not necessary to provide reinforcements during the manufacturing process.

The mesh 109.3 has a junction including sharp angles to prevent fluid stagnation and reduce pressure drops. For example, a sharp-angled shape such as a triangle or a pentagon—seen in a plane parallel to the reference direction—facilitates the realization by additive manufacturing because it is not necessary to provide reinforcements during manufacturing. The section of the branches can be circular in shape. Other cross-sectional shapes (square, triangular, rectangular, elliptical) are possible to control turbulence and/or optimize the strength of the tubular mesh network 100. The three exemplary junctions of FIG. 9, can be combined with the mesh variants (various number or arrangement of branches) according to FIGS. 3 to 8.

Also, meshes 103, 104, 105, 105, 106, 107, 108, 109.1; 109.2, 109.3 may be stacked in any appropriate arrangement, including in the directions associated with cylindrical or Cartesian coordinates.

The structure of a mesh 103, 104, 104, 105, 106, 106, 107, 108, 109.1, 109.2, 109.3 as described above in terms of number of branches and provisions is not limited to the examples given in the figures.

The complexity of the mesh network structure could not be obtained by conventional means of manufacture and is therefore achieved, according to the present application, by additive manufacture, from powder, possibly titanium or aluminium. The thickness of the layers can be between 20 µm and 50 µm, which makes it possible to reach a thickness of the tubes forming the meshes of about 0.4 to 0.6 mm, and partitions/walls of 0.60 mm.

In the present application-based process (not shown), two steps are performed:
  (a) heat exchanger design 50;
  (b) manufacturing the heat exchanger 50 by additive manufacturing in a printing direction, the printing direction being parallel to the reference direction 58.

With additive manufacturing, it is possible to plan complex shape flow paths that intersect through the matrix.

Also, the present application is not limited to the use for oil/fuel heat exchange.

We claim:

1. A heat exchanger between a first fluid and a second fluid, the heat exchanger comprising:
    a reference direction; and
    a network of tubes delimiting an inner passage for the first fluid, the network comprising:
        a plurality of meshes, each of the meshes, being formed, successively according to the reference direction, of at least two curvilinear branches, called anterior branches, of a junction where the two anterior branches meet, and of at least two curvilinear branches, called posterior branches, diverging from the junction;
        wherein the plurality of meshes includes at least one first mesh, at least one second mesh and at least one third mesh distinct from the second mesh;
        wherein at least one anterior branch of the first mesh is connected to at least one posterior branch of the second mesh and at least one other anterior branch of the first mesh is connected to at least one posterior branch of the third mesh; and
        wherein the network of tubular meshes is arranged between an inlet manifold and an outlet manifold.

2. The heat exchanger according to claim 1, wherein the plurality of meshes comprises:
    a stack of 5 to 40 meshes successively arranged in the reference direction.

3. The heat exchanger according to claim 1, wherein the plurality of meshes comprises:
    between 200 and 3000 meshes.

4. The heat exchanger according to claim 1, wherein the branches and junctions are formed by walls having a thickness of between 0.4 and 0.8 mm.

5. The heat exchanger according to claim 1, wherein at least one of the meshes comprises:
    a number of anterior branches that is different from the number of its posterior branches.

6. The heat exchanger according to claim 1, wherein the number of branches of each mesh is 6.

7. The heat exchanger according to claim 1, wherein at least one of the meshes supports at least one internal or external fin.

8. The heat exchanger according to claim 1, wherein the heat exchanger is a one-piece part made by additive manufacturing based on aluminium powder.

9. The heat exchanger according to claim 1, wherein the first fluid is fuel and the second fluid is oil.

* * * * *